United States Patent
Hara

[11] Patent Number: 5,519,785
[45] Date of Patent: May 21, 1996

[54] CORRECTING METHOD FOR DIRECTIONAL DATA OF STREAKED PATTERNS AND INFORMATION PROCESSING APPARATUS FOR EXECUTING IT AND CORRECTING METHOD FOR PITCH DATA OF STREAKED PATTERNS AND INFORMATION PROCESSING APPARATUS FOR EXECUTING IT

[75] Inventor: Masanori Hara, Tokyo, Japan

[73] Assignee: NEC Corporation, Tokyo, Japan

[21] Appl. No.: 298,289

[22] Filed: Aug. 31, 1994

[30] Foreign Application Priority Data

Aug. 31, 1993 [JP] Japan ................................. 5-214671

[51] Int. Cl.⁶ ............................................ G06K 9/03
[52] U.S. Cl. ............................... 382/124; 382/311
[58] Field of Search ......................... 382/124, 125, 382/197, 199, 311, 293; 395/155, 161

[56] References Cited

U.S. PATENT DOCUMENTS

| | | | |
|---|---|---|---|
| 4,047,154 | 9/1977 | Vitols et al. | 340/146.3 E |
| 5,140,642 | 8/1992 | Hsu et al. | 382/5 |
| 5,187,747 | 2/1993 | Capello et al. | 382/4 |

Primary Examiner—Leo Boudreau
Assistant Examiner—Andrew W. Johns
Attorney, Agent, or Firm—Foley & Lardner

[57] ABSTRACT

A method and an apparatus for correcting directional data and pitch data are provided. Initially, a picture of a streaked pattern and corresponding directional data having a plurality of zones are entered and displayed on a display unit. The operator then designates the areas to be corrected in the direction data by designating a contour and direction indicating lines. The directions of the zones through which the direction indicating lines pass are set to the directions of these indicating lines. Subsequently, the directions of zones where the direction was not set are calculated so as to minimize a function H. With the distance between a zone Z and a defined zone Zi being represented by Ri, the function H is set so that the correlation between the direction D of the zone Z and the direction Di of the defined zone Zi improves as the value of Ri decreases.

12 Claims, 18 Drawing Sheets

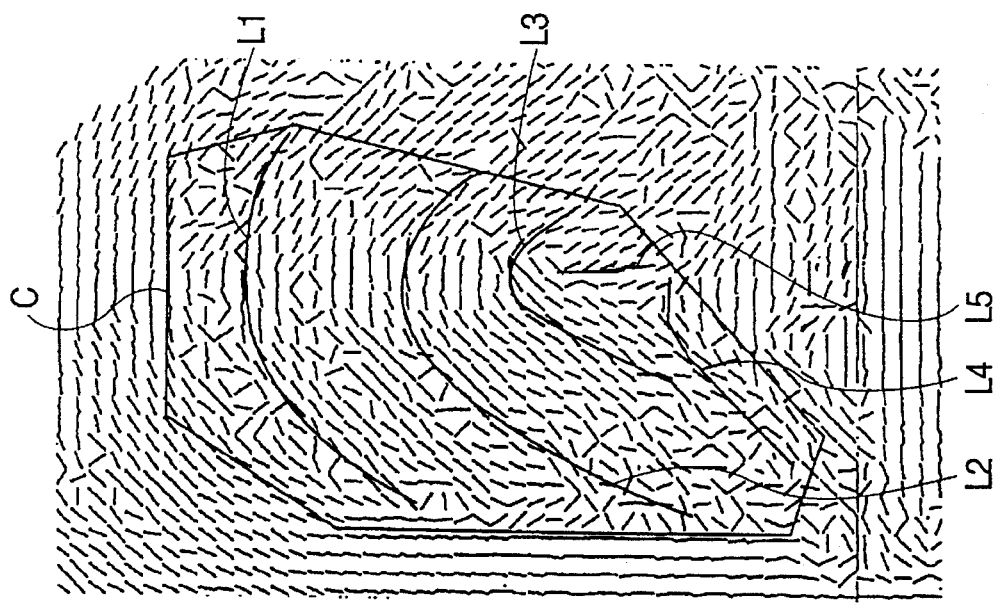
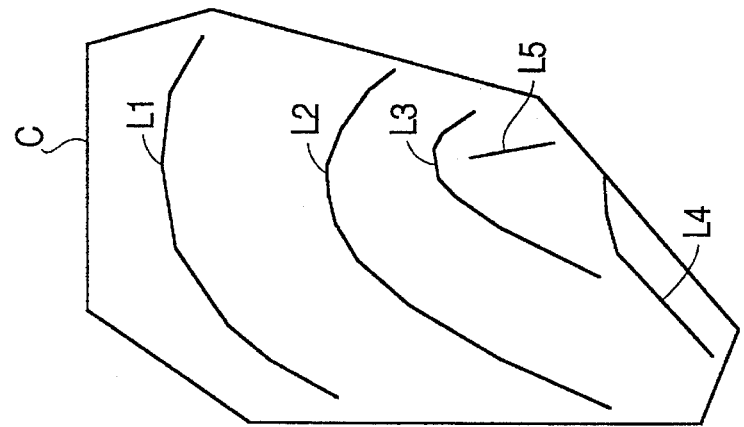
FIG. 6(b)
FIG. 6(a)

CORRECTING METHOD FOR DIRECTIONAL DATA OF STREAKED PATTERNS AND INFORMATION PROCESSING APPARATUS FOR EXECUTING IT AND CORRECTING METHOD FOR PITCH DATA OF STREAKED PATTERNS AND INFORMATION PROCESSING APPARATUS FOR EXECUTING IT

BACKGROUND OF THE INVENTION

The present invention relates to a method and an apparatus for correcting the directional data of streaked patterns such as fingerprints, and more particularly to a method and an apparatus for correcting directional data as instructed by the operator. The invention also relates to a method and an apparatus for correcting the pitch data of streaked patterns such as fingerprints, and more particularly to a method and an apparatus for correcting pitch data as instructed by the operator.

In matching a streaked pattern such as a fingerprint, processing is carried out to clarify the picture of this streaked pattern. For instance in matching a fingerprint, the picture of an obscure latent fingerprint is clarified, and the clarified fingerprint image is matched with the pictures of reference fingerprints stored in a data base. By clarifying the picture of a latent fingerprint, feature points of the fingerprint can be accurately detected, resulting in greater chances for successful fingerprint recognition.

Clarification of a streaked pattern uses data representing the direction (hereinafter referred to as "directional data") of this streaked pattern. Directional data are provided corresponding to each of a plurality of zones into which the streaked pattern are divided. On the basis of these directional data, a mask is prepared to clarify the streaked pattern. Filtering the picture of the streaked pattern with this mask clarifies the picture.

Together with directional data, pitch data are also used for clarifying the picture of a streaked pattern. Pitch data represent the pitch between streaks.

The directional data of a streaked pattern are automatically extracted by moving a search point from a point where the direction is to be detected. Density at the search point varies rapidly when the search point moves across streaks, while density varies slowly when it moves along the streaks. The moving direction of the search point at the time when the density varies least coincides with the direction of streaks.

Pitch data are automatically extracted on the basis of the directional data extracted in the above-described manner. More specifically, pitch data are obtained by calculating the frequency of the density variations of the picture with respect to the direction across the streaks.

As described above, according to the prior art, directional data and pitch data are automatically extracted from the picture of a streaked pattern. However, if the picture is obscure as in the case of a latent fingerprint, the extracted directional data and pitch data are partly inaccurate. Noise in the picture and the relative scarcity of differences in shade make the extraction of these data difficult.

According to the prior art, even if the operator visually detects the inaccuracy of directional data and pitch data, he can not correct it, because manual alteration of data in each zone would require a tremendous amount of labor.

SUMMARY OF THE INVENTION

In view of these problems, a first object of the present invention is to provide a method and an apparatus for correcting directional data and pitch data as instructed by the operator.

A second object of the invention is to reduce the number of instructions the operator is required to give to correct directional data and pitch data.

A third object of the invention is to provide a method and an apparatus for enabling the operator to readily correct directional data and pitch data.

A fourth object of the invention is to provide a method and an apparatus for obtaining more natural corrected directional data and pitch data.

A fifth object of the invention is to provide a method and an apparatus permitting high-speed correction of directional data and pitch data.

Among these objects, objects regarding directional data are achieved by a method for correcting data on directions each of which is given to one of a plurality of areas, consisting of a step to set, in at least one of the plurality of areas, a direction indicated for this area via an input unit and at the same time to make the area for which the direction is set a defined area, and another step to calculate the directions of other areas than the defined area on the basis of the direction of the defined area.

The direction of the defined area is designated by a step to designate a line for indicating a line via the input unit; another step to make the region where this line passes the defined area, and still another step to set the direction of the line in this defined area as the direction of the defined area.

It is also possible to set a contour within the plurality of areas and correct directions only with respect to the areas within this contour.

The direction of a area Z is determined so as to be close to the direction of a defined area located near this area Z. More specifically, a direction D, which minimizes the value of a function H, is set as the direction of the area A. The function H is obtained by the following procedure.

First, a number of defined areas $Z_i$ ($i=1, 2, \ldots$) located around the area Z are selected. A function $h_{1i}$ whose value is minimized when the direction D of the area A coincides with the direction $D_i$ of an area $Z_i$ and is maximized when they are orthogonal to each other is set. A function $h_{2i}$ whose value decreases with an increase in the distance $R_i$ between the area Z and the area $Z_i$ is set. Functions resulting from the multiplication of $h_{1i}$ and $h_{2i}$ are represented by $H_i$. The sum of functions $H_i$ with respect to i is the function H.

Objects regarding pitch data are achieved by a method comprising a step to enter, in one or a plurality of points $O_k$ ($k=1, 2, \ldots$) in a streaked pattern, pitches $P_k$ ($k=1, 2, \ldots$) at these points $O_k$ via an input unit, and another step to calculate the pitch of each of the plurality of areas on the basis of the pitches at points $O_k$.

When a pitch $P_k$ is set, a circle around a point $O_k$ whose radius is the pitch $P_k$ at this point $O_k$ is displayed on a display unit.

It is also possible to set a contour within the plurality of areas and correct pitches only with respect to the areas within this contour.

The pitch of the area Z is obtained by weighted averaging of the pitches $P_k$. Weights $W_k$ of the pitches $P_k$ are set so as to decrease with an increase in the distance $R_k$ between points $O_k$ and the area Z.

BRIEF DESCRIPTION OF THE DRAWINGS

Other objects, features and advantages of the present invention will become more apparent when the following detailed description is read in conjunction with the accompanying drawings, wherein:

FIGS. 6(a) and 6 (b) are diagrams for explaining the operation of the pitch setting section 24;

In these figures, the same reference numerals denote the same parts, respectively.

DETAILED DESCRIPTION OF THE PREFERRED EMBODIMENTS

Next will be described in detail a first preferred embodiment of the present invention with reference to drawings. This embodiment relates to a method and an apparatus for correcting directional data.

Figure 1A:
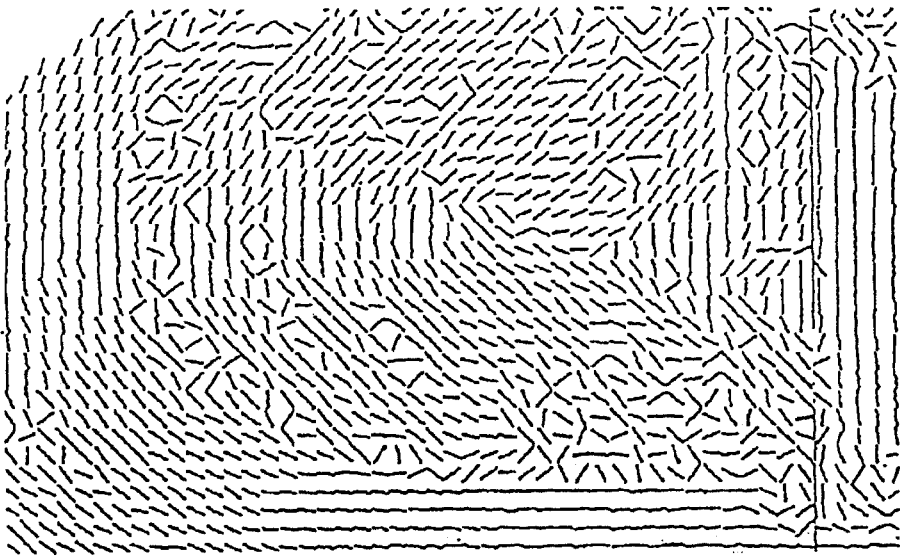
FIGS. 1(a) and 1(b) illustrating an example each of the picture data 1 and the directional data 2.
Figure 1B:

FIG. 1(a) illustrates an example of picture data of a streaked pattern. This streaked pattern is a latent fingerprint, consisting of what are known as ridges. The picture data of FIG. 1(a) are obscure especially in areas on the lefthand side. FIG. 1(b) shows directional data extracted from the picture data of FIG. 1(a) by the aforementioned prior art. In the areas where picture data are obscure, directional data is inaccurate.

Figure 2A:
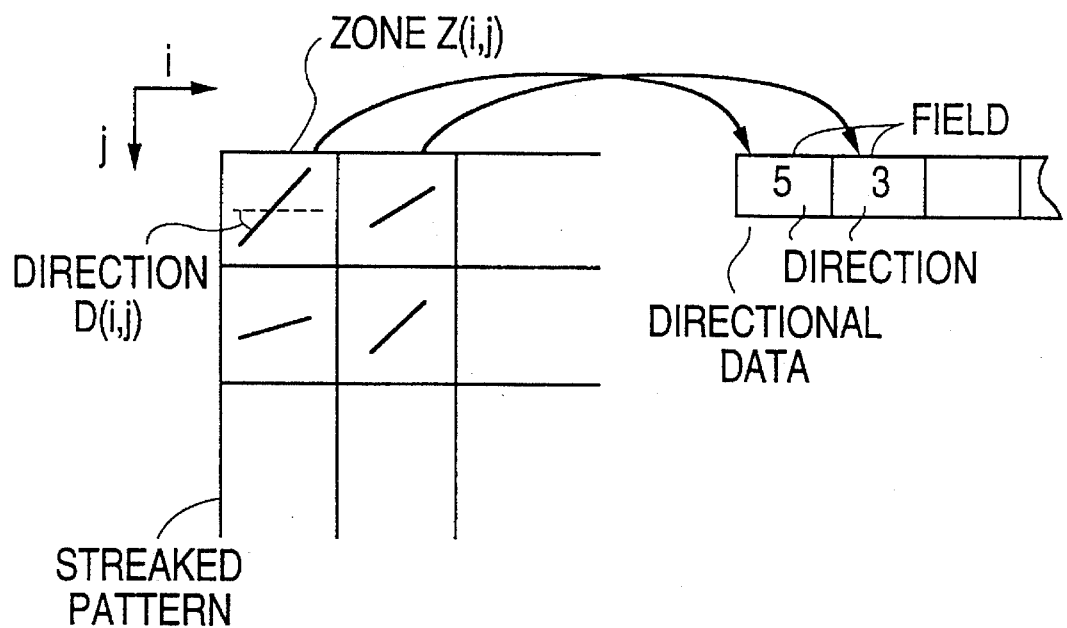
FIGS. 2(a) and 2(b) illustrating the structure of the directional data 2.

Referring to FIG. 2(a), a streaked pattern is divided into a plurality of zones Z (i, j). The direction of the streaked pattern in zone Z (i, j) is referred to as D (i, j). The directional data have a plurality of fields. Each field corresponds to a zone Z (i, j) and stores the direction D (i, j ) of that zone.

Figure 2B:
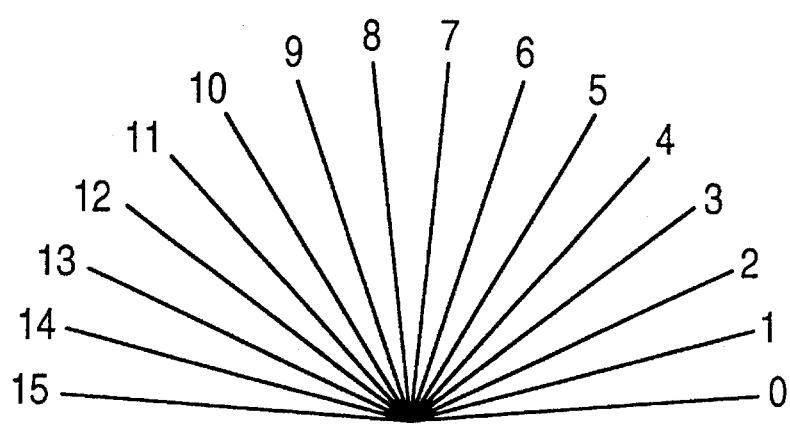

Hereinafter, "a field of the direction data corresponding to a zone" is referred to as "a zone of the directional data" for simplicity. Referring to FIG. 2(b) , the directions D are quantized in 16 directions.

Figure 3:
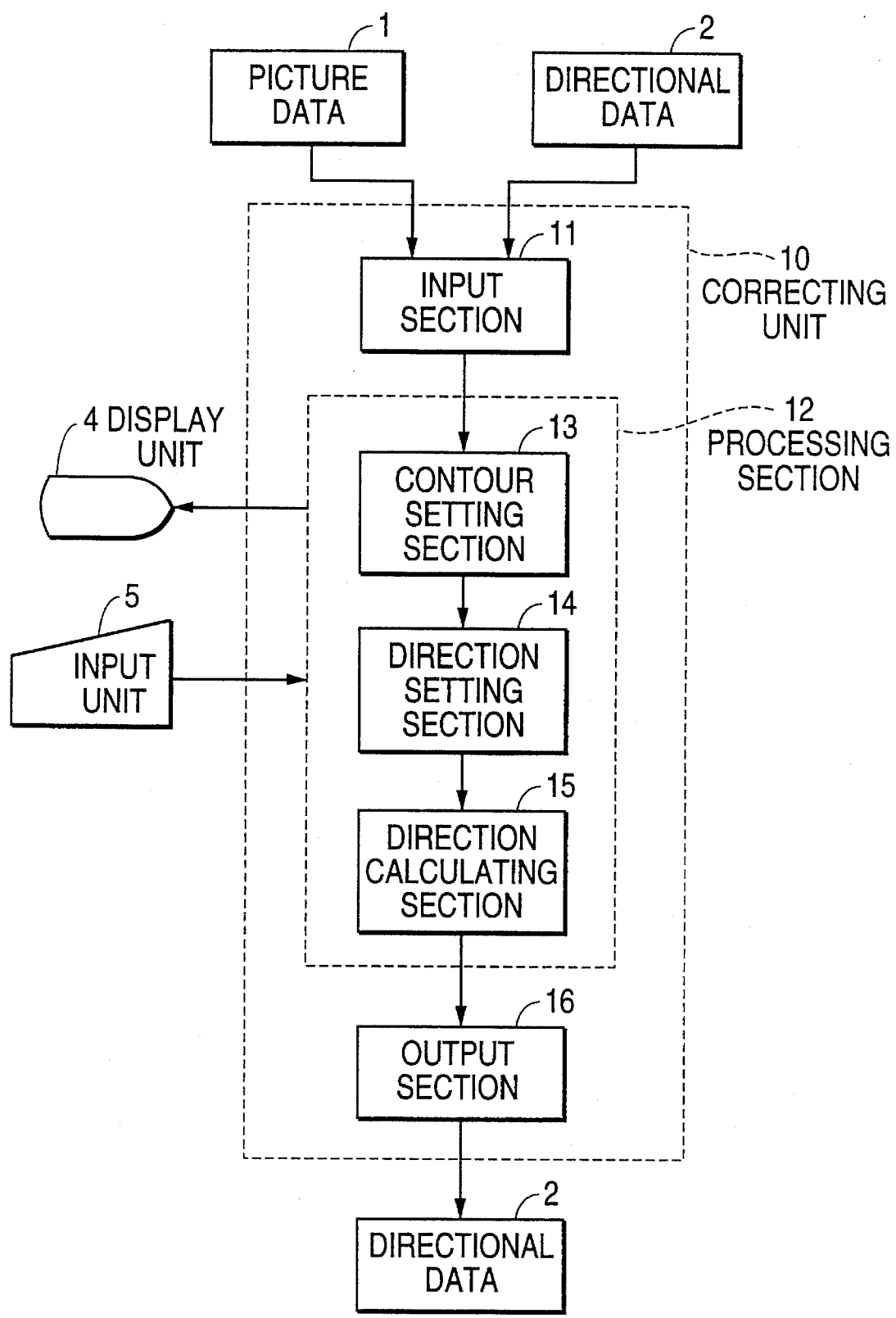
FIG. 3 is a block diagram illustrating the structure of an apparatus, which is a first preferred embodiment of the present invention.

Referring now to FIG. 3, the correcting unit 10 of this embodiment comprises an input section 11, a processing section 12 and an output section 16. The input section 11 enters picture data 1 and directional data 2 from outside. The processing section 12 corrects the directional data 2 supplied via the input section 11. The processing section 12 is connected to a display unit 4 and an input unit 5. Instructions for correcting the directional data 2 are given by the operator via the input unit 5. Since many of the operator's instructions concern the designation of coordinates, it is desirable for the input unit 5 to be provided with a pointing device, such as a mouse or a tablet. The processing section 12 displays on the display unit 4 information needed for correction. The output section 16 supplies the corrected directional data 2 to an external destination, which may be a fingerprint matching apparatus, for instance. The display unit 4 and the input unit 5 can be shared with the fingerprint matching apparatus.

The processing section 12 comprises a contour setting section 13, a direction setting section 14, and a direction calculating section 15. The contour setting section 13 sets the contour of areas in which directions are to be corrected in accordance with the operator's instructions given via the input section 5. The direction setting section 14 sets the directions D of some of zones Z of the directional data 2 in accordance with the operator's instructions given via the input section 5. The zones Z whose directions D have been set by the direction setting section 14 are called defined zones. The direction calculating section 15, using the directions D of the defined zones, calculates the directions D of other zones Z than the defined zones. The calculated directions D are set as the directions of those zones Z.

Next will be described the operation of this embodiment with reference to drawings.

Figure 4:
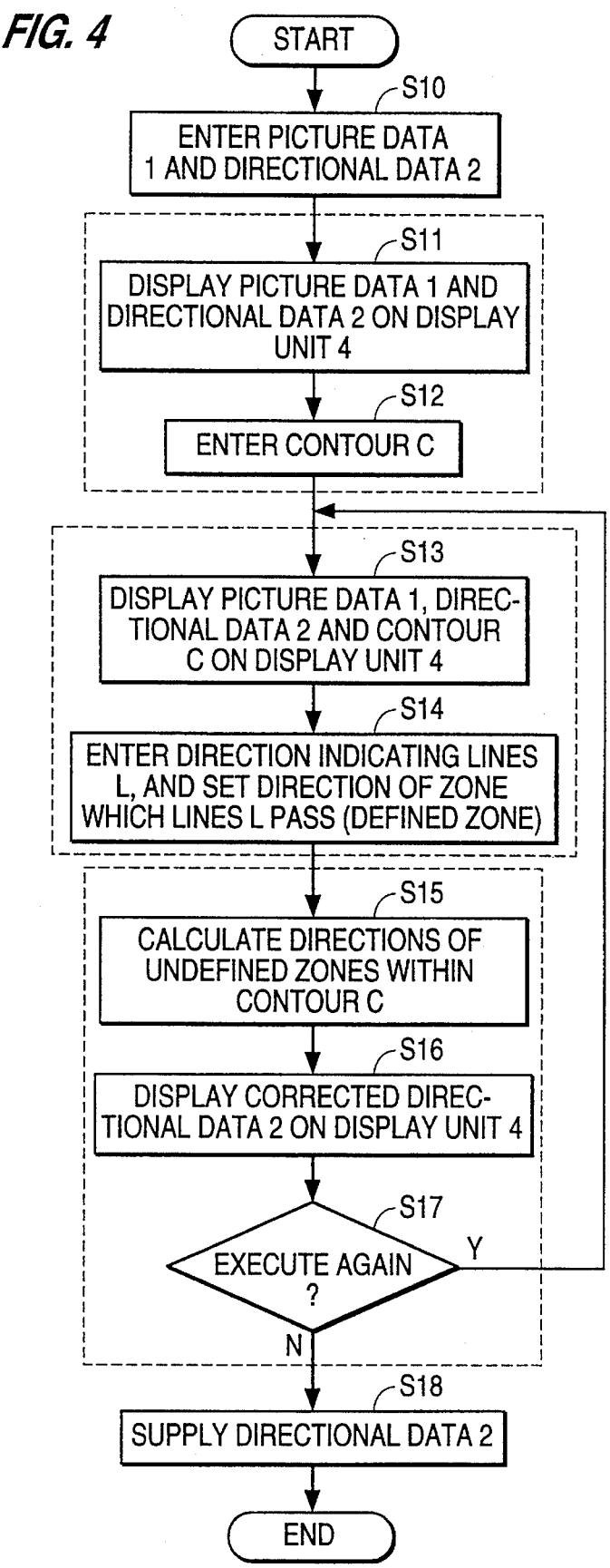
FIG. 4 is a flow chart showing the operation of the apparatus of FIG. 3.

Referring to FIG. 4, step 10 is executed by the input section 11. Steps 11 and 12 are executed by the contour setting section 13. Steps 13 and 14 are executed by the direction setting section 14. Steps 15 to 17 are executed by the direction calculating section 15. Step 18 is executed by the output section 16.

At step 10, the input section 11 receives the picture data 1 and the directional data 2 from outside.

At step 11, the contour setting section 13 displays the picture data 1 and the directional data 2 on the display unit 4. The contour setting section 13 displays the directional data 2 so as to overlap the picture data 1. Accordingly, the operator can see in which area or areas of the picture data 1 the directional data 2 are inaccurate.

Figure 5B:
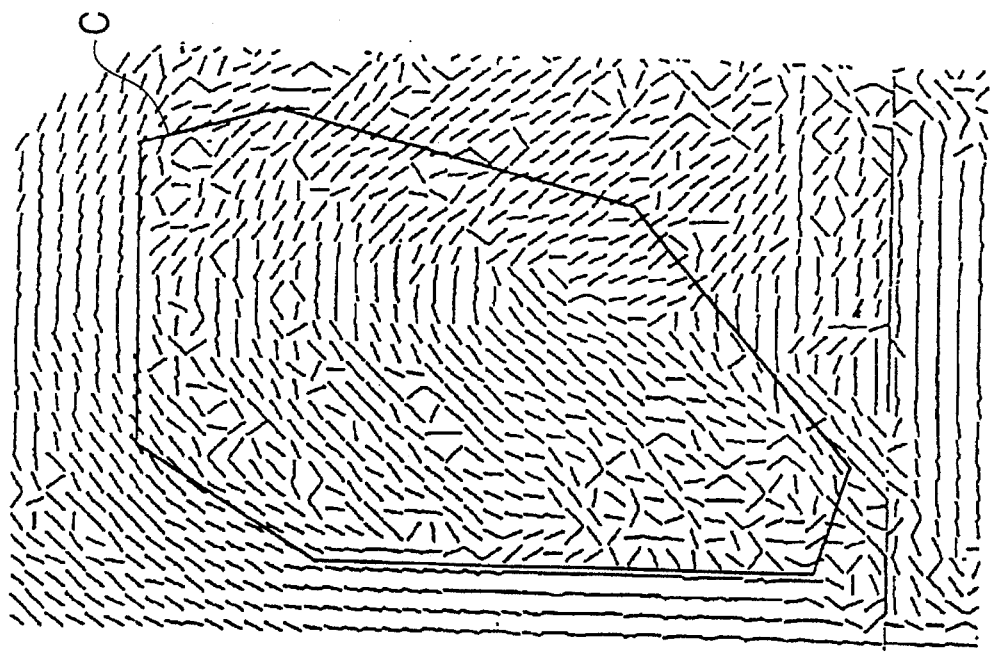
FIGS. 5(a) and 5(b) are diagrams for explaining the operation of the contour setting section 13.
Figure 5A:
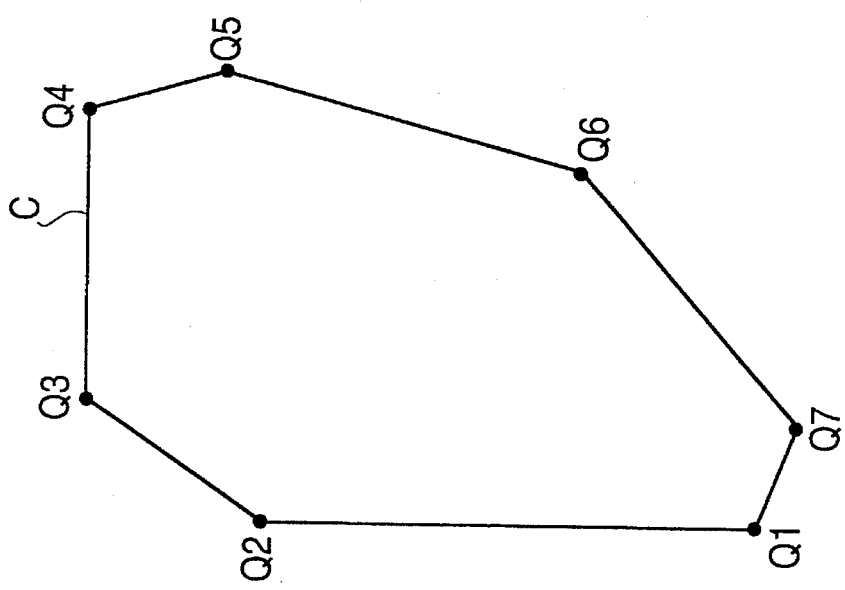

At step 12, the operator designates the contour C of areas in which the directional data 2 are to be corrected. The contour setting section 13 sets the contour C in accordance with this instruction. Referring to FIG. 5(a), the coordinates of apexes Q1 to Q7 of the controu C are designated by the operator. Referring to FIG. 5(b), the positions of apexes are designated by moving a cursor to the position to be designated on the direction data displayed on the display unit 4. It is easy to designate the apexes because picture data 1 is also displayed so as to be overlapped by the directional data.

However, a polygon is designated as a contour C in this embodiment, it is easy to modify this embodiment so that a closed curved line is designated as a contour C.

Referring again to FIG. 4, at step 13, the direction setting section 14 displays the picture data 1, the directional data 2 and the contour C on the display unit 4.

Figure 7:
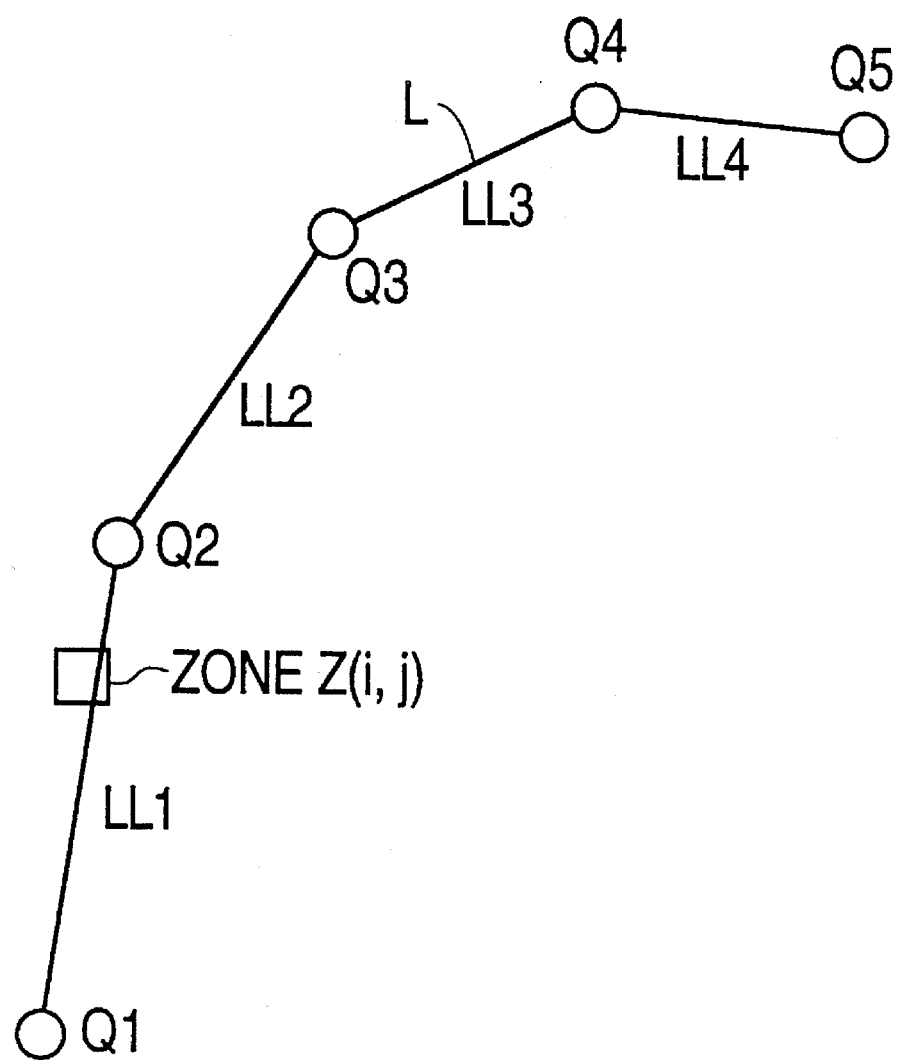
FIG. 7 is a diagram for explaining the method of designating the direction indicating lines L.

At step 14, the operator designates direction indicating lines L via the input unit 5. The direction indicating lines L are lines indicating the directional trends. Referring to FIG. 6(a), in this particular case five direction indicating lines L1 to L5 are entered. Referring to FIG. 6(b), the input operation is accomplished on the directional data 2. On an actual screen, the picture data 1 and the directional data 2 are displayed overlapping each other. The operator enters the direction indicating lines L along the displayed streaks. Referring to FIG. 7, each direction indicating line L is a broken line consisting of a plurality of straight lines LLi. The operator enters the apexes Qi of each direction indicating line L.

The direction of each line LLi is set in the direction D (i, j) of the zone Z (i, j) the line LLi passes. In further detail, out of the 16 directions shown in FIG. 2(b), the one closest to the direction of the line LLi is set in the direction D (i, j). The direction of the line LLi can be readily calculated from the coordinates of the end points of this line.

However a broken line is designated as a direction indicating line L in this embodiment, it is easy to modify this embodiment so that a curved line is designated as a direction indicating line L. When a curved line is designated, direction D (i, j) of a zone Z (i, j) is determined by the cordinates of two points where the direction indicating line L acrosses the contour of the zone Z.

Referring again to FIG. 4, at step 15, the directions D (i, j) of the zones Z (i, j) which were not set at step 14 are calculated.

Figure 8A:
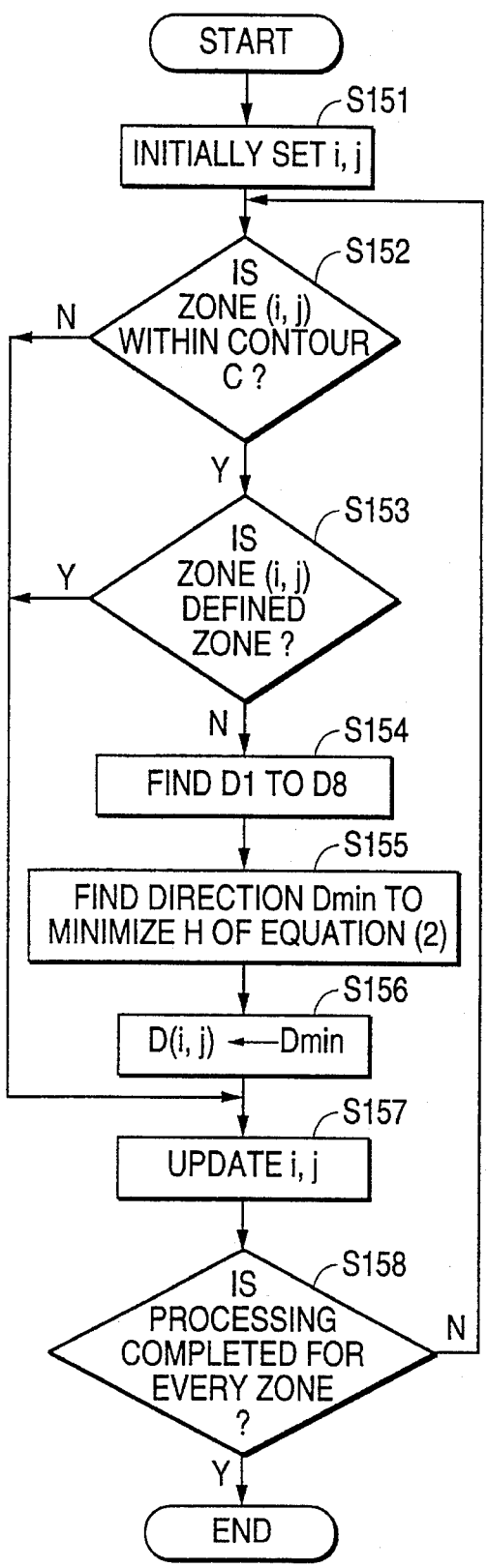
FIG. 8(a) is a flow chart showing details of step 15 in FIG. 4.

Referring to FIG. 8, step 15 consists of substeps 151 to 156.

At substep 151, variables i and j are initially set.

At substep 152, it is judged whether or not a zone Z (i, j) is positioned within the contour line C. If the zone Z (i, j) is not within the contour C, substep 157 is executed. If it is within the contour C, substep 153 is executed.

At substep 153, it is judged whether or not the zone Z (i, j) is a defined zone. If the zone Z (i, j) is a defined zone, substep 157 is executed. If it is not, substep 154 is executed.

At substep 154, the directions D1 to D8 are figured out. The directions D1 to D8 are the directions of the eight zones Z1 to Z8 around the zone Z (i, j).

Figure 9:
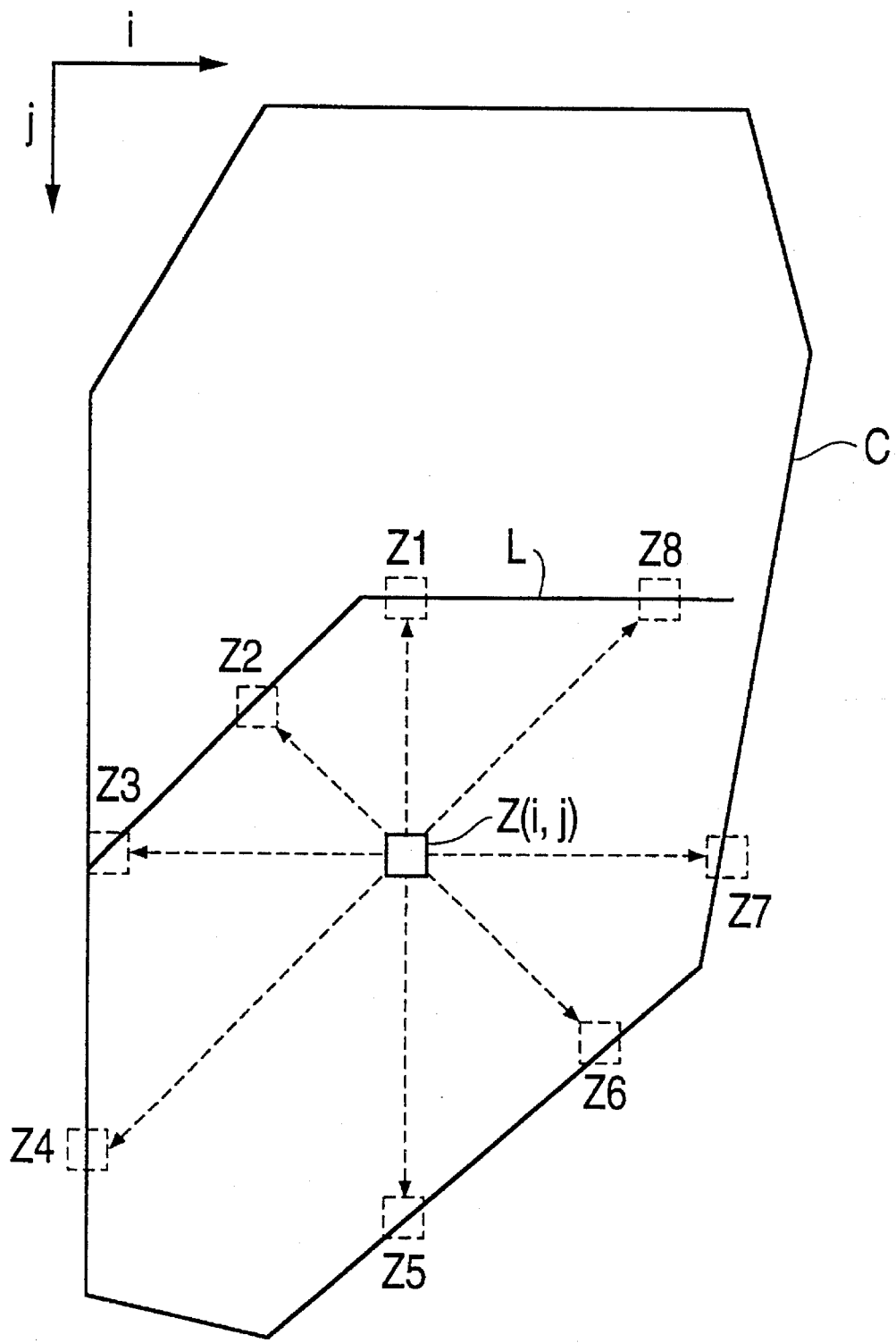
FIG. 9 is a diagram for explaining the operation of the pitch setting section 24.
Figure 10:
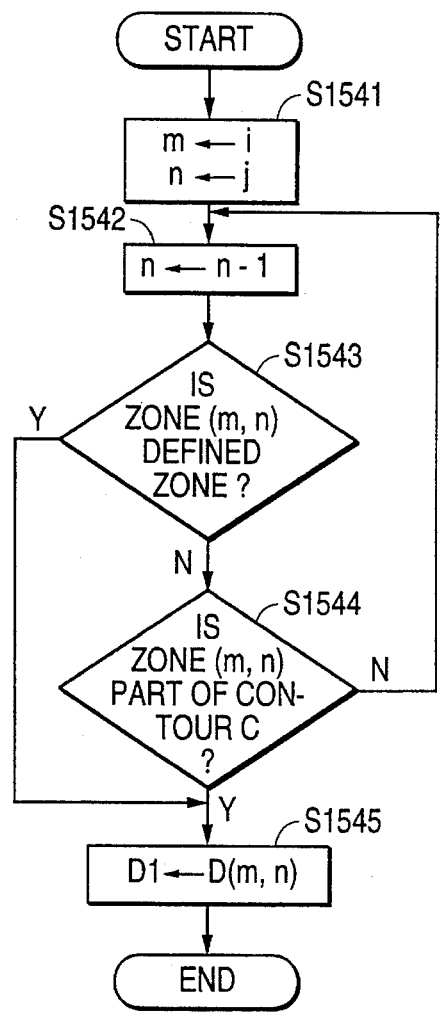
FIG. 10 is a flow chart showing details of substep 154 in FIG. 8.

Referring now to FIG. 9, out of the zones Z1 to Z8, the zone Z1 is the defined zone which is first encountered when the search point is moved upward from the zone Z (i, j). If a zone which the contour C passes is reached before any defined zone is encountered, that zone is selected as the zone Z1. In further detail, referring to FIG. 10, the method to select the zone Z1 consists of sub-substeps 1541 to 1545.

At sub-substep 1541, the values of variables i and j are substituted for variables m and n.

At sub-substep 1542, 1 is subtracted from n. This corresponds to the upward shift of the search point (m, n).

At sub-substep 1543, it is judged whether or not the zone Z (m, n) is a defined zone. If the zone Z (m, n) is a defined zone, sub-substep 1545 is executed. If it is not, sub-substep 1544 is executed.

At substep 1544, it is judged whether or not the contour C passes the zone Z (m, n). If the contour C passes the zone Z (m, n), sub-substep 1545 is executed. If it does not, sub-substep 1542 is executed.

At sub-substep 1545, the zone Z (m, n) is selected as the zone Z1. As a result, the direction D (m, n) of the zone Z (m, n) is set in the direction D1 of the zone Z1.

The method for the selection of zones Z2 to Z8 is substantially the same as the above-described method for the zone Z1, the only difference being the shifting direction of the search point. In selecting the zones Z2 to Z8, the search point moves toward the upper left, left, lower left, bottom, lower right, right and upper right, respectively.

In this embodiment, Z1 to Z8 are used in determining a direction of a undefined zone, however, more than eight zones can be used.

Referring again to FIG. 8, at substep 155, the direction D that minimizes the value of H given in Equation (2) is figured out. The direction D that minimizes the value of H is represented by Dmin.

$$h_k = 1 - |\cos(D - D_k)| \quad (1)$$
$$w_k = \frac{1}{R_k^2}$$

$$H(D) = \sum_{k=1}^{8} \frac{1 - |\cos(D - D_k)|}{R_k^2} \quad (2)$$

H in Equation (2) has the following meaning. H is the weighted average of functions hi. The weight Wk of each hk is $1/Ri^2$, where Rk is the distance between a zone Z (i, j) and another zone Zk (k=1 to 8), and hk is a function whose value is the smallest when the direction D and the direction Dk coincide with each other and the greatest when the two directions are orthogonal to each other. Finding the direction D to minimize the value of hi is equal to finding the direction whose difference from the direction Dk is the smallest.

In order to calculate a natural direction D, when the zone Z (i, j) is close to the zone Zk, it is desirable that the direction D of the zone Z (i, j) and the direction Dk of the zone Zk substantially coincide with each other. When Z (i, j) and Zk are relatively far from each other, some disparity between D and Dk would pose no problem. The aforementioned direction Drain which minimizes H satisfies this requirement. Thus there is a close correlation between the direction of a defined zone located close to the zone Z (i, j) and the direction D (i, j) of the zone Z (i, j), and the greater the distance between the two zones, the more remote the correlation between Z (i, j) and D (i, j).

The direction Dmin is calculated by the following procedure. H is calculated for each of the 16 directions shown in FIG. 2(b), and the direction which, according to the calculated results, gives the smallest H is Dmin. Thus only 16 calculations are sufficient to find Dmin.

Referring again to FIG. 8, at substep 157, Dmin calculated at substep 156 is substituted for the direction D (i, j) of the zone Z (i, j). This corrects the direction D (i, j) of the zone Z (i, j).

Figure 8B:
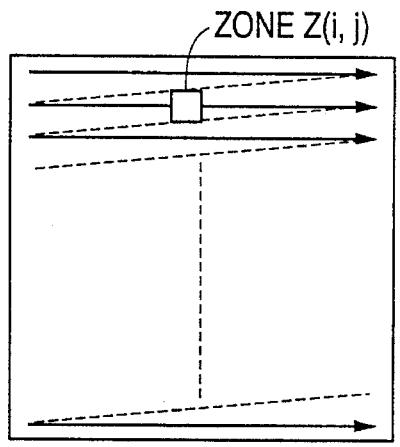
FIG. 8(b) is a diagram for explaining the operation of step 157 in FIG. 8(a)

At substep 158, the variables i and j are updated. As shown in FIG. 8(b) for instance, the variables i and j are so updated as to have the zone Z (i, j) raster-scan the whole directional data 2.

At substep 158, it is judged whether or not processing has been completed for every zone Z. If there is any unprocessed zone, substep 152 is executed again. When every zone has been processed, step 16 of FIG. 4 is executed.

Referring again to FIG. 4, at step 16, the direction calculating section 15 displays the corrected directional data 2 on the display unit 4.

At step 17, the operator gives an instruction as to whether or not correction is to be made again. If unsatisfied with the directional data 2 displayed at step 16, the operator instructs re-correction. If re-correction is instructed, step 13 is executed again. If no re-correction is instructed, step 18 is executed.

At step 18, the output section 16 supplies the directional data 2 to outside.

Figure 11:
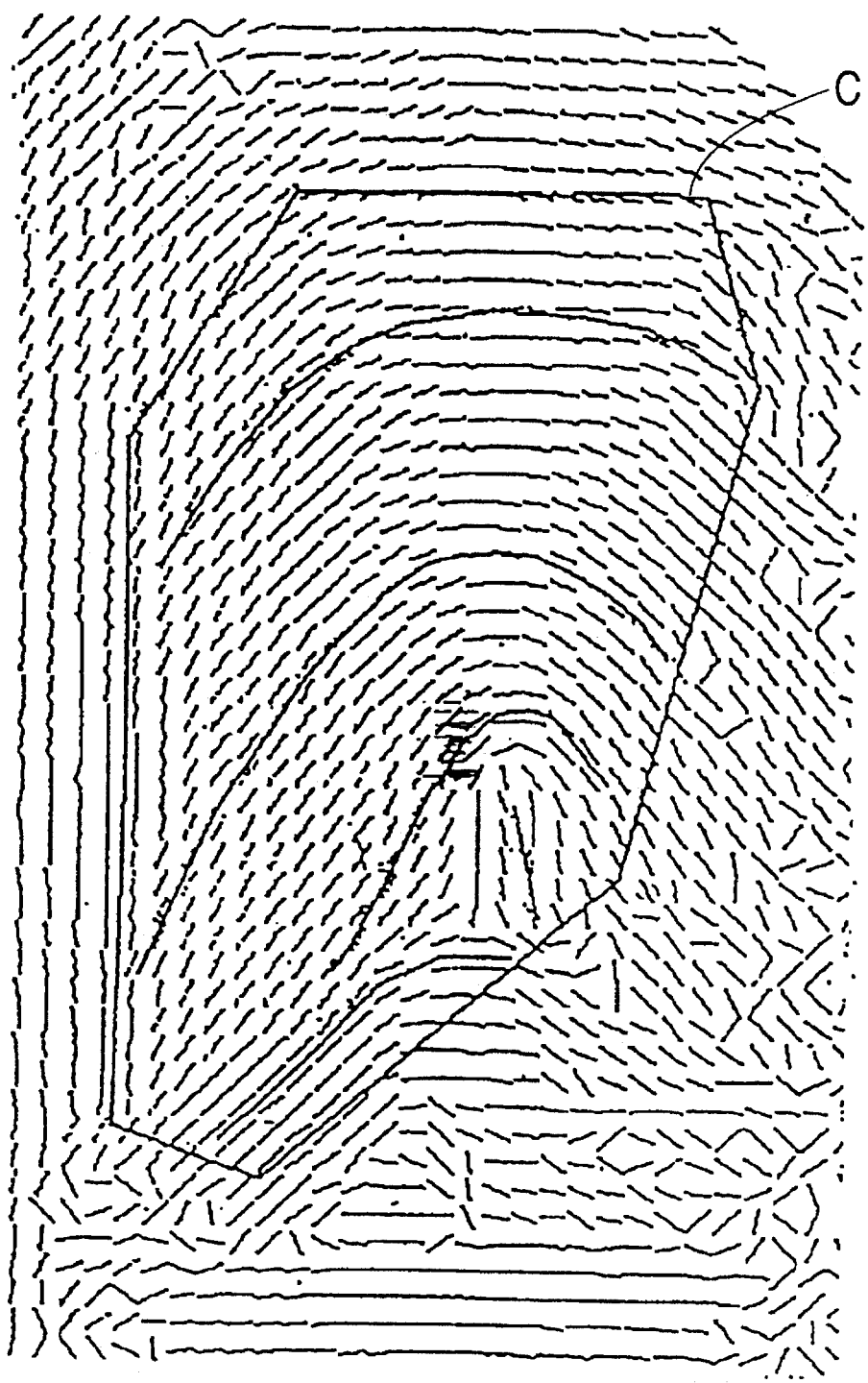
FIG. 11 is a diagram illustrating the directional data 2 corrected by the first preferred embodiment.

FIG. 11 illustrates the directional data 2 corrected by the above-described method. Compared with the uncorrected data 2 shown in FIG. 1(b), the directions of the zones within the contour C are corrected. The corrected directions vary continuously and look natural.

As so far described, the method of this preferred embodiment allows any part of automatically extracted data 2 found inaccurate to be corrected as instructed by the operator. Only by designating a few direction indicating lines L, the directional data 2 of the aforementioned zones can be corrected. Since it is easy to visually judge what kind of direction indicating line L is effective, the direction indicating lines L can be readily set. As the directions of still undefined zones can be figured out on the basis of Equation (2), the corrected directional data 2 are continuous and look natural. Furthermore, because Dmin to minimize the value of Equation (2) can be found by only 16 calculations, this method can be executed at high speed.

A variation of the above-described embodiment of the invention will now be described. Although the directions of zones within the contour C are corrected in the above-described embodiment, it is also possible to correct only the zones close to direction indicating lines without setting a contour.

Next will be described a second preferred embodiment of the present invention with reference to drawings. This embodiment relates to the correction of pitch data.

Figure 13:
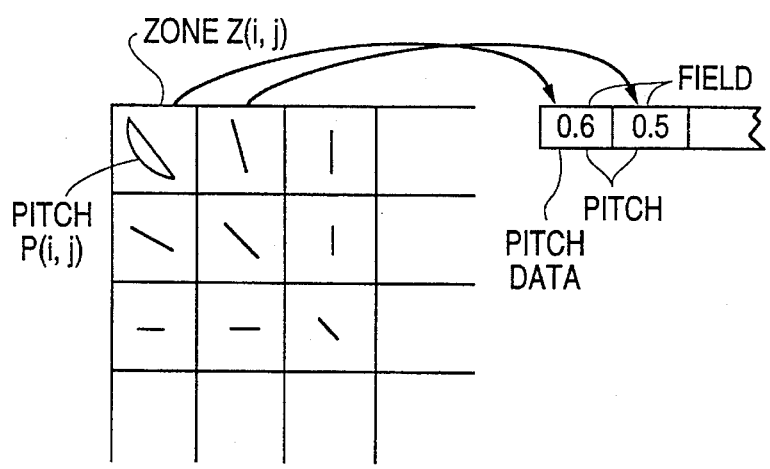
FIG. 13 is illustrating the structure of the pitch data 7.
Figure 12B:
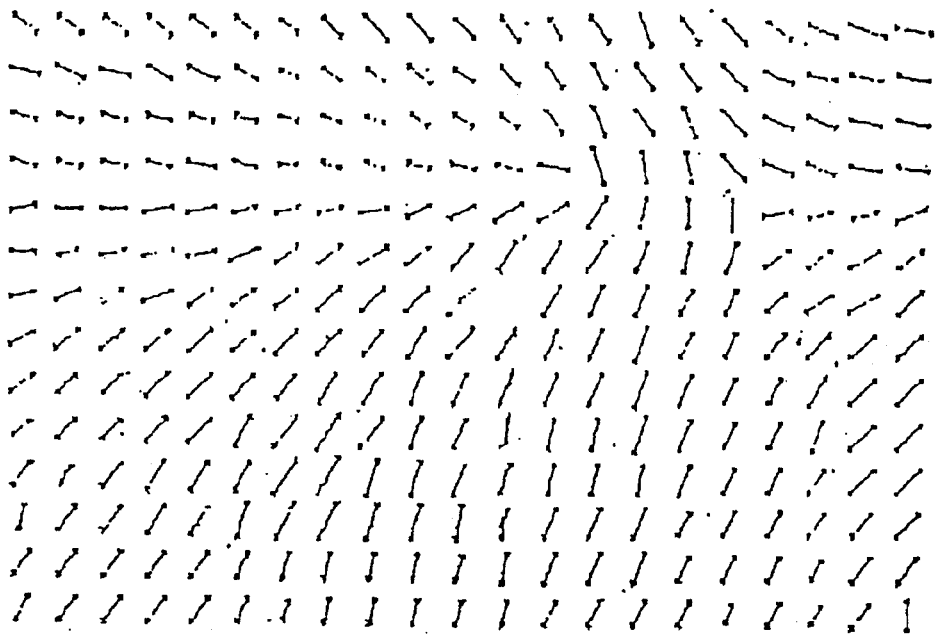
FIGS. 12(a) and 12(b) illustrating examples of the picture data 1 and the pitch data 7.
Figure 12A:
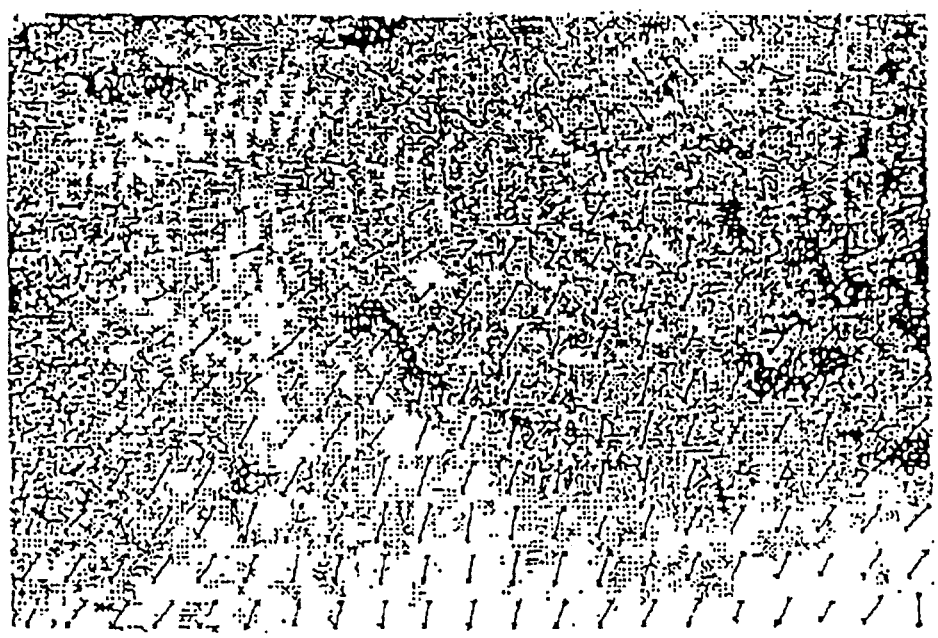

In FIG. 12(a), the picture of FIG. 1(a) and pitch data extracted from this picture are shown overlapping each other. Referring to FIG. 13, a streaked pattern is divided into a plurality of zones Z (i, j). The pitch of the streaked pattern is referred to as P (i, j). The pitch data has a plurality of fields each corresponding to a zone Z (i, j). Each field stores the pitch P (i, j) of the zone Z (i, j) corresponding thereto. Referring again to FIG. 12(a), the lengths of dashes in the diagram represent the pitches of streaks. The dashes are in directions orthogonal to the corresponding streaks. In FIG. 2(b), only the pitch data of FIG. 1(a) are shown. In the upper left area, the pitch data are inaccurate. Correcting such inaccurate pitch data is the object of this embodiment.

Figure 14:
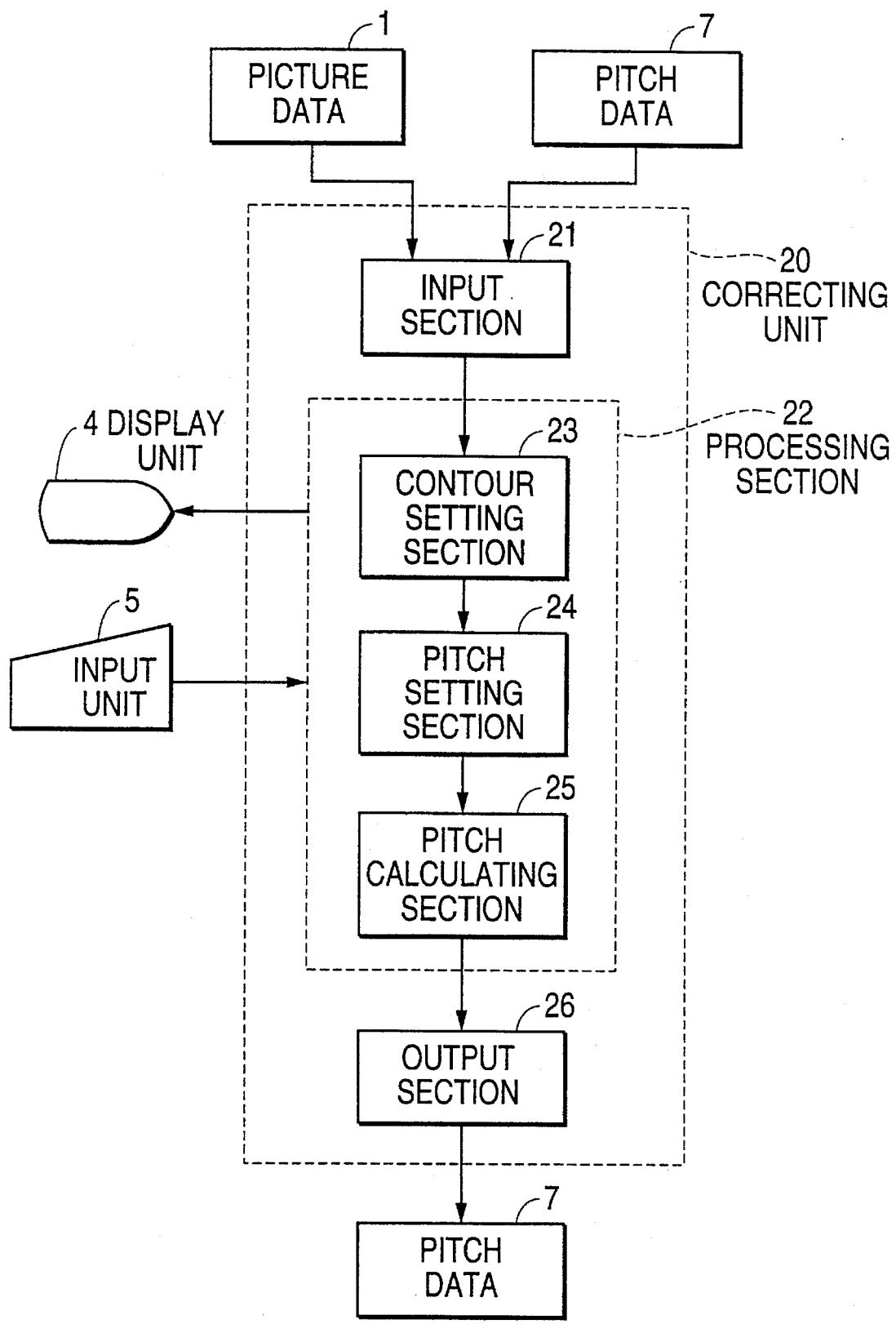
FIG. 14 is a block diagram illustrating the structure of another apparatus, which is a second preferred embodiment of the present invention.

Referring now to FIG. 14, the correcting unit 20 of this embodiment comprises an input section 21, a processing section 22 and an output section 26. The input section 21 receives the picture data 1 and pitch data 7 from outside. The processing section 22 corrects the pitch data 7 supplied via the input section 21. To the processing section 22 are connected the display unit 4 and the input unit 5. Instructions for correcting the pitch data 7 are given by the operator via the input unit 5. Since many of the operator's instructions concern the designation of coordinates, it is desirable for the input unit 5 to be provided with a pointing device, such as a mouse or a tablet. The output section 26 supplies the pitch data 7 corrected by the processing section 22 to an external destination, which may be a fingerprint matching apparatus, for instance. The display unit 4 and the input unit 5 can be shared with an external apparatus for use in conjunction with the present invention, such as a fingerprint matching apparatus.

The processing section 22 comprises a contour setting section 23, a pitch setting section 24, and a pitch calculating section 25. The contour setting section 23 sets the contour of areas to be corrected in accordance with the operator's instructions given via the input section 5. The pitch setting section 24 sets the pitches Pi at some points Oi of the picture data 1 in accordance with the operator's instructions given via the input section 5. The pitch calculating section 15, on the basis of the pitches Pi, calculates the pitches P (i, j) of the zones Z (i, j) of the pitch data 7.

Next will be described the operation of this embodiment with reference to drawings.

Figure 15:
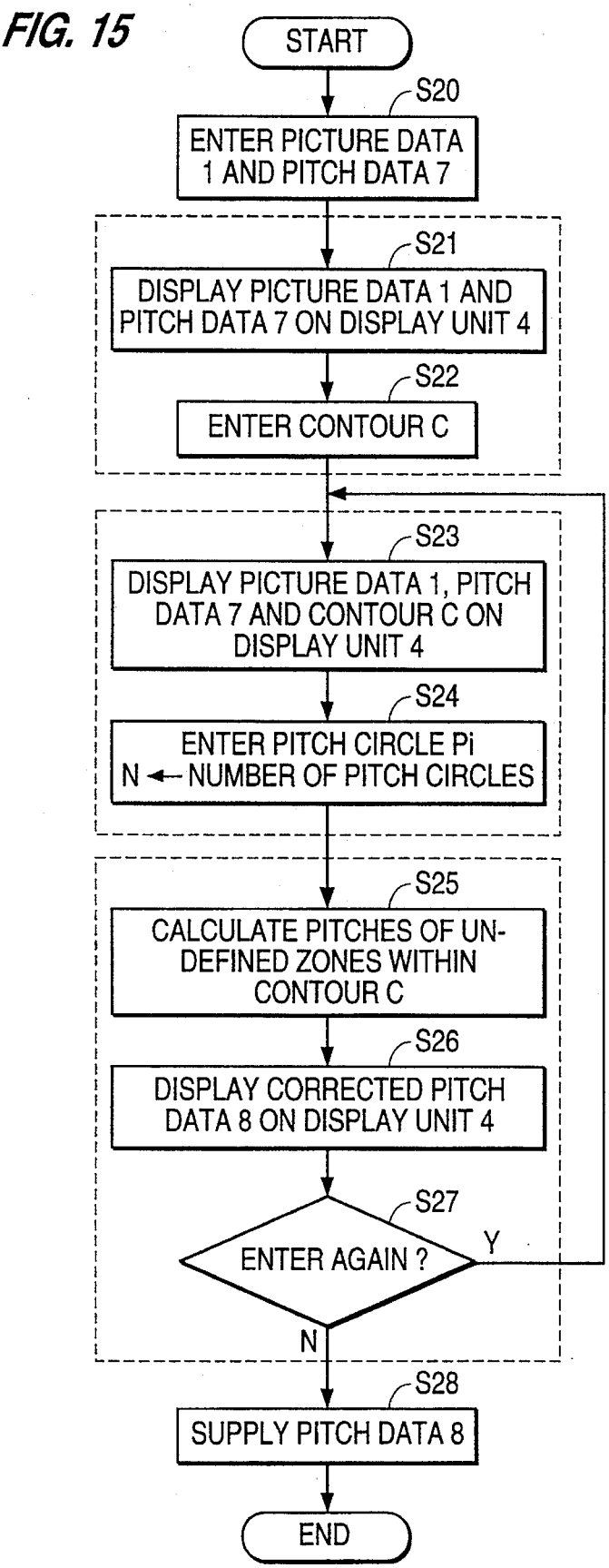
FIG. 15 is a flow chart showing the operation of the apparatus of FIG. 14.

Referring to FIG. 15, step 20 is executed by the input section 21. Steps 21 and 22 are executed by the contour setting section 23. Steps 23 and 24 are executed by the pitch setting section 24. Steps 25 to 27 are executed by the pitch calculating section 25. Step 28 is executed by the output section 26.

At step 20, the input section 21 receives the picture data 1 and the pitch data 7 from outside.

At step 21, the processing section 22 displays the picture data 1 and the pitch data 7 on the display unit 4. As shown in FIG. 12(a), the picture data 1 and the pitch data 7 are displayed overlapping each other. Accordingly, the operator can see in which area or areas of the picture data 1 the pitch data 7 are inaccurate.

Figure 16B:
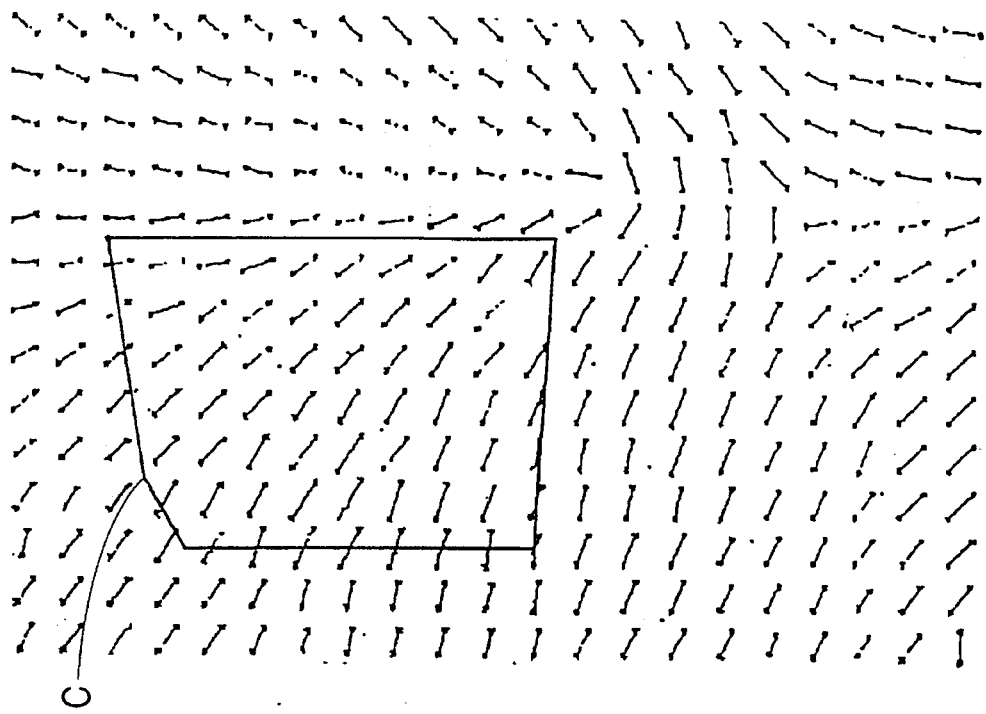
FIGS. 16(a) and 16(b) are diagrams for explaining the operation of the contour setting section 23.
Figure 16A:
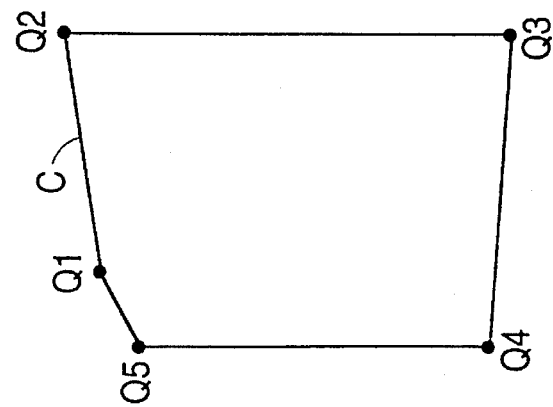

At step 22, the operator designates the contour C of areas in the pitch data 7 which are to be corrected. The contour setting section 23 memorizes the designated contour C. Referring to FIG. 16(a), the coordinates of apexes Q1 to Q5 of the contour C are designated by the operator. Referring FIG. 16(b), the positions of apexes are designated by moving a cursor to the position to be designated on the pitch data 7 displayed on the display unit 4. It is easy to designate the apexes because picture data 1 is displayed so as to be overlapped by the pitch data 7.

At step 23, the pitch setting section 24 displays the picture data 1, the pitch data 7 and the contour C on the display unit 4.

Figure 17:
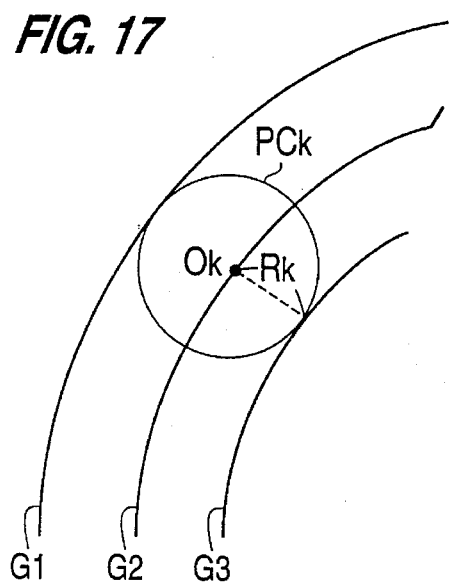
FIG. 17 is a diagram for describing the method of setting the pitch circles PCk.

At step 24, pitch circles PCk (k=1, 2, ... ) are designated by the operator, referring to the display on the display unit 4. The operator can designate the position according to the center point Ok of each pitch circle PCk and the pitch of streaks at the point Ok according to the radius Rk of the pitch circle PCk. Referring to FIG. 17, each pitch circle PCi is designated by the following procedure. First, the cursor is positioned on a ridge G2. Pressing a prescribed button in this state causes the point Ok to be designated. Next, as the cursor is moved, a pitch circle PCk passing the position of the cursor is displayed. The cursor is shifted so as to bring the pitch circle PCk into contact with another ridge G3 adjoining G2. Pressing a prescribed button in this state causes the pitch circle PCk to be designated. At the same time, the radius Rk of the pitch circle PCk is designated. In this manner, any desired number of pitch circles PCk can be designated. The number of pitch circles PCk is represented by N.

Figure 18A:
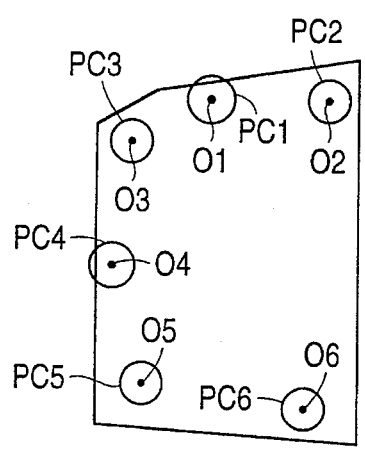
FIGS. 18(a) and 18(b) are diagrams for describing the operation of the pitch setting section 24.
Figure 18B:
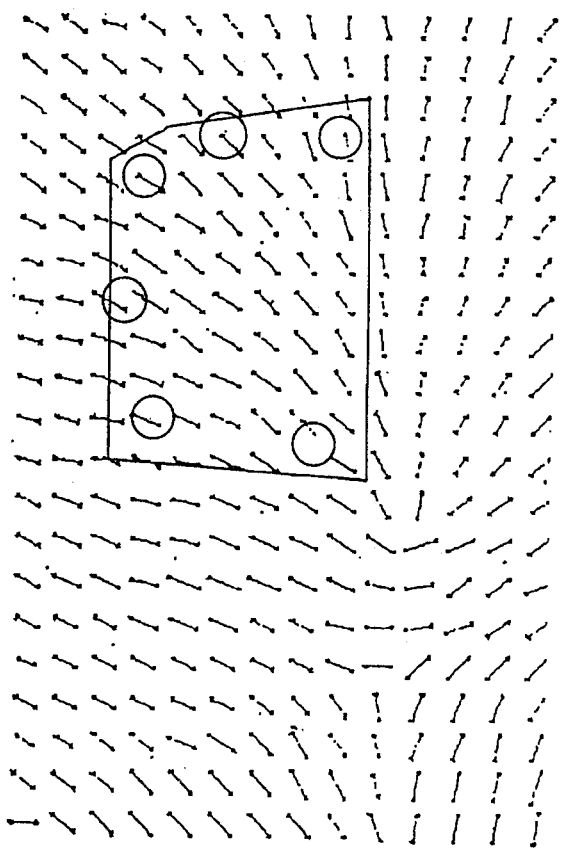

Referring to FIG. 18, in this case, six pitch circles PCk, PC1 to PC6, have been designated. Referring to FIG. 18(b), the designation of the pitch circles PCk is accomplished over displayed pitch data 7. Since the picture data 1 are also shown overlapping the pitch data 7 on an actual input screen, it is easy to designate the pitch circles PCk.

Referring again to FIG. 15, at step 25, the pitch calculating section 25 calculates the pitches P (i, j) of the zones Z (i, j).

Figure 19:
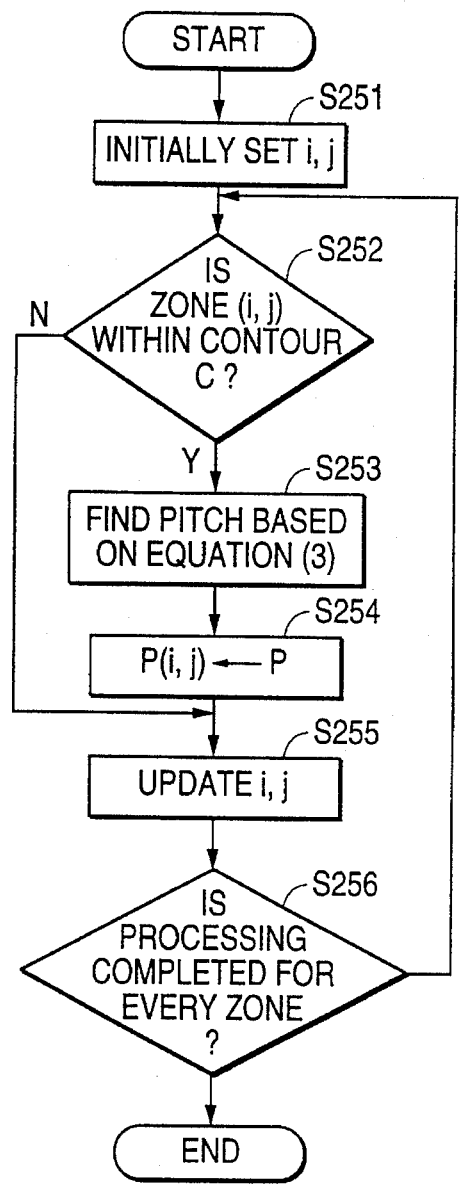
FIG. 19 is a flow chart showing details of step 25 in FIG. 15.

Referring to FIG. 19, step 25 consists of substeps 251 to 256.

At substep 251, the variables i and j are initially set.

At substep 252, it is judged whether or not a zone Z (i, j) is positioned within the contour line C. If the zone Z (i, j) is not within the contour C, substep 255 is executed. If it is within the contour C, substep 253 is executed.

At substep 253, the pitch P is calculated on the basis of Equation (3) below.

$$P = \frac{\sum_{k=1}^{N} \frac{P_k}{R_k^2}}{\sum_{k=1}^{N} \frac{1}{R_k^2}} \quad (3)$$

In Equation (3), Rk is the distance between the center Oi of each pitch circle PCi and a zone Z (i, j). Equation (3) gives the weighted average of pitches Pk. The weight of each pitch Pk is $1/R_k^2$. Equation (3) has the following meaning. In order for corrected pitches to be continuous and natural, the pitch P (i, j) of each zone Z (i, j) should be substantially equal to the pitch Pk of the pitch circle PCk close to it. On the other hand, there is no close correlation between the pitch P (i, j) of a zone Z (i, j) and the pitch Pk of a pitch circle PCk distant from the zone Z (i, j). Equation (3) satisfies these constraints.

At substep 254, P is substituted for P (i, j).

At substep 255, i and j are updated. As shown in FIG. 8(*b*), i and j are so updated as to have the zone Z (i, j) raster-scan the whole pitch data 7.

Referring FIG. 19 again, at substep 256, it is judged whether or not processing has been completed for every zone. If there is any unprocessed zone, substep 252 is executed again. When every zone has been processed, step 26 of FIG. 15 is executed.

Referring to FIG. 15, at step 26, the pitch calculating section 25 displays the corrected pitch data 7 on the display unit 4.

At step 27, the operator gives an instruction as to whether or not correction is to be made again. If unsatisfied with the pitch data 7 displayed at step 26, the operator instructs re-correction. If re-correction is instructed, step 23 is executed again. If no re-correction is instructed, step 28 is executed.

At step 28, the output section 26 supplies the pitch data 7 to outside.

Figure 20:
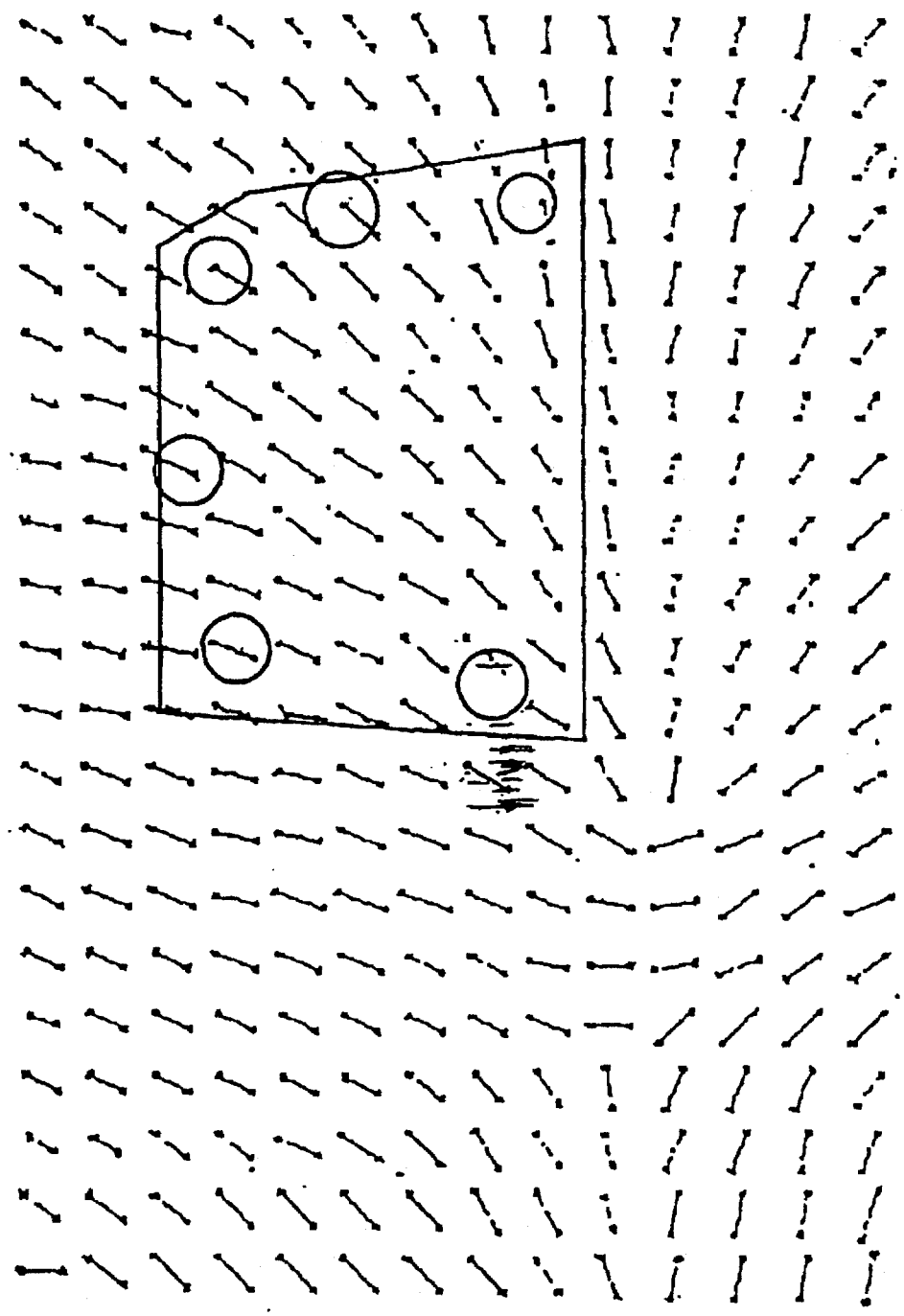
FIG. 20 illustrating the pitch data 7 corrected by the second preferred embodiment.

FIG. 20 illustrates the pitch data 7 corrected by the above-described method. Compared with the uncorrected data 7 shown in FIG. 12(*b*), the pitches of the zones within the contour C are corrected. The corrected pitches vary continuously and look natural.

As so far described, the method of this preferred embodiment allows any part of automatically extracted data 7 found inaccurate to be corrected as instructed by the operator. Only by designating a desired number of pitch circles PCi, the pitch data 7 of the aforementioned zones can be corrected. Since it is easy to visually judge what kind of pitch circle PCi is effective, the pitch circles PCi can be readily set. As the pitch of each zone is determined on the basis of Equation (3), the corrected pitch data 7 are continuous and look natural.

Next will described a variation of the above-described embodiment of the invention. Although the pitches of zones within the contour C are corrected in the above-described embodiment, it is also possible to correct the pitches of only the zones close to pitch circles PCi without setting a contour.

It would be even more effective to correct the pitch data 7 by the following procedure, which combines the first and second preferred embodiments. First the directional data 2 are corrected by the method of the first embodiment, and then pitch data 7 are extracted from the picture data 1 by using the corrected directional data 2. These pitch data 7 are corrected by the method of the second embodiment.

As the present invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds, are therefore intended to be embraced by the claims.

What is claimed is:

1. A directional data correcting method executed by an apparatus provided with a display unit and an input unit, for correcting directional data, said directional data comprising fields, said fields corresponding to respective areas of a streaked pattern, each of said fields storing a direction of said streaked pattern in an area corresponding thereto, comprising:

a first step of receiving said directional data and a picture of said streaked pattern;

a second step of displaying said streaked pattern and said directional data on said display unit;

a third step of setting at least one direction designated using said input unit into at least one of said fields, said direction being designated on said streaked pattern displayed on said display unit; and a fourth step of setting directions into undefined fields, the directions set into said undefined fields being calculated on the basis of directions set into defined fields, said defined fields being said fields into which a direction was set in said third step, and said undefined fields being said fields into which a direction was not set in said third step.

2. A directional data correcting method, according to claim 1, wherein said third step further comprises the steps of:

setting a direction designating line in said streaked pattern, said direction designating line being designated using said input unit; and setting a direction of said direction designating line into fields corresponding to areas through which said direction designating line passes.

3. A directional data correcting method, according to claim 1, further comprising the step of:

setting a contour in said streaked pattern following said second step; and wherein said fourth step calculates directions of said undefined fields corresponding which are within said contour.

4. A directional data correcting method, according to claim 1, wherein said fourth step further comprises the steps of:

selecting field Z, said field Z referring to one of said undefined fields;

selecting field Zk (k=1,2, ... ), said field Zk referring to a prescribed number of said fields; and calculating direction D on the basis of direction Dk and distance Rk, said direction D referring to a direction set in said field Z, said direction Dk referring to a direction set in said field Zk, said distance Rk referring to a distance between an area corresponding to said field Z and an area corresponding to said field Zk.

5. A directional data correcting method, according to claim 4, wherein:

said direction D calculated in said ninth step minimizes the value of the equation $$H(D) = \sum_k \frac{1 - |\cos(D - D_k)|}{R_k^2}$$

wherein H(D) is the weighted average of the measurements of the differences between directions D and Dk.

6. An information processing apparatus connected to a display unit and an input unit for correcting directional data, said directional data comprising fields, said fields corresponding to respective areas of a streaked pattern, each of said fields storing a direction of said streaked pattern in an area corresponding thereto, comprising:

input means for receiving said directional data and a picture of said streaked pattern;

direction setting means for displaying said streaked pattern and said directional data on said display unit, and for setting at least one direction designated using said input unit into at least one of said fields, said direction being designated on said streaked pattern displayed on said display unit; and direction calculating means for setting directions into undefined fields, the directions set into undefined fields being calculated on the basis of directions set into defined fields, said defined fields being said fields into which a direction is set by said direction setting means, and said undefined fields being said fields into which a direction is not set by said direction setting means.

7. A pitch data correcting method executed by an apparatus provided with a display unit and an input unit, for correcting pitch data, said pitch data comprising fields, said fields corresponding to respective areas of a streaked pattern, each of said fields storing a pitch of said streaked pattern in an area corresponding thereto, comprising:

a first step of receiving said pitch data and a picture of said streaked pattern;

a second step of displaying said streaked pattern and said pitch data on said display unit;

a third step of setting a pitch Pk (k=1,2, ... ) with respect to point Ok in said streaked pattern, said pitch Pk and point Ok being designated using said input unit, said pitch Pk and said point Ok being designated on said streaked pattern displayed on said display unit; and a fourth step of calculating a pitch P to be set into field Z on the basis of pitch Pk and distance Rk, said field Z referring to one of said fields, said distance Rk referring to a distance between said point Ok and an area corresponding to said field Z.

8. A pitch data correcting method, according to claim 7, wherein said third step further comprises the step of:

displaying a circle on said display unit, the center of said circle being said point Ok, and the radius of said circle being said pitch Pk.

9. A pitch data correcting method, according to claim 7, further comprising the step of:

setting a contour in said streaked pattern following said second step; and wherein an area corresponding to said field Z is within said contour in said fourth step.

10. A pitch data correcting method, according to claim 7, wherein:

said pitch P is calculated by weighted averaging of the pitch Pk in the fourth step, said pitch P representing the pitch to be set into said field Z, the weight of said pitch Pk being determined on the basis of said distance Rk.

11. A pitch data correcting method, according to claim 10, wherein:

said pitch P is calculated according to the equation $$P = \frac{\sum_k \frac{P_k}{R_k^2}}{\sum_k \frac{1}{R_k^2}}.$$

12. An information processing apparatus connected to a display unit and an input unit, for correcting pitch data, said pitch data comprising fields, said fields corresponding to respective areas of a streaked pattern, each of said fields storing a pitch of said streaked pattern in an area corresponding thereto, comprising:

input means for receiving said pitch data and a picture of said streaked pattern;

pitch setting means for displaying said streaked pattern and said pitch data on said display unit, and for setting a pitch Pk (k=1,2, ... ) with respect to point Ok in said streaked pattern, said pitch Pk and point Ok being designated using said input unit, said pitch Pk and point Ok being designated on said streaked pattern displayed on said display unit; and pitch calculating means for calculating a pitch to be set into field Z on the basis of said pitch Pk and distance Rk, said field Z referring to one of said fields, said distance Rk referring to a distance between said point Ok and an area corresponding to said field Z.

* * * * *